United States Patent [19]
Mizuno

[11] Patent Number: 5,939,218
[45] Date of Patent: *Aug. 17, 1999

[54] POLYELECTROLYTIC FUEL CELL AND THE METHOD OF CONTROLLING THE OPERATION THEREOF

[75] Inventor: Seiji Mizuno, Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/555,404

[22] Filed: Nov. 9, 1995

[30] Foreign Application Priority Data

| Nov. 11, 1994 | [JP] | Japan | 6-302948 |
| Dec. 12, 1994 | [JP] | Japan | 6-332072 |

[51] Int. Cl.$^6$ .................................................. H01M 8/04
[52] U.S. Cl. ........................................... 429/23; 429/34
[58] Field of Search ............................. 429/22–25, 13, 429/17, 19, 34

[56] References Cited

U.S. PATENT DOCUMENTS

| 3,268,364 | 8/1966 | Cade et al. . |
| 3,343,991 | 9/1967 | Koenig . |
| 3,432,356 | 3/1969 | Christianson . |
| 3,753,780 | 8/1973 | Fetterman ................ 429/23 |
| 4,722,873 | 2/1988 | Matsumura ................ 429/24 |
| 4,729,930 | 3/1988 | Beal et al. ............. 429/23 X |
| 4,755,439 | 7/1988 | Trocciola et al. ........... 429/22 |
| 4,826,741 | 5/1989 | Aldhart et al. ............. 429/19 |
| 4,859,545 | 8/1989 | Scheffler et al. ........... 429/17 |
| 4,904,548 | 2/1990 | Tajima .................... 429/22 |
| 4,943,493 | 7/1990 | Vartanian ................. 429/17 |
| 5,290,641 | 3/1994 | Harashima ................ 429/17 |
| 5,441,819 | 8/1995 | Voss et al. ................ 429/13 |
| 5,478,662 | 12/1995 | Strasser ............... 429/23 X |

FOREIGN PATENT DOCUMENTS

| 0 073 044 | 3/1983 | European Pat. Off. . |
| 0 417 464 | 3/1991 | European Pat. Off. . |
| 0 589 535 A1 | of 1994 | European Pat. Off. . |
| 0 596 366 | 5/1994 | European Pat. Off. . |
| 0 596 367 | 5/1994 | European Pat. Off. . |
| 1 547 910 | 10/1968 | France . |
| 54-144934 | 11/1979 | Japan . |
| 58-87770 | 5/1983 | Japan . |
| 58-94767 | 6/1983 | Japan . |
| 62-176064 | 8/1987 | Japan . |
| 63-236262 | of 1988 | Japan . |
| 4-167367 | 6/1992 | Japan . |
| 5-251098 | 9/1993 | Japan . |
| 6-68886 | 3/1994 | Japan . |
| 6-89730 | 3/1994 | Japan . |
| 6-223850 | 8/1994 | Japan . |
| WO 93/18556 | 9/1993 | WIPO . |

OTHER PUBLICATIONS

Proceedings of the 24th Intersociety Energy Conversion Engineering Conference, vol. 3, pp. 1587–1591, 1989, R.J. Lawrance, et al., "Proton Exchange Membrane Fuel Cell Development" (No Month).

*Primary Examiner*—Stephen Kalafut
*Attorney, Agent, or Firm*—Oblon, Spivak, McClelland, Maier & Neustadt, P.C.

[57] ABSTRACT

When at least either one of the output voltage and internal resistance of a plurality of stacked unit cells and the humidity of oxidizing gas being discharged has deviated from the tolerance, the supply conditions of oxidizing gas to the polyelectrolytic fuel cell are changed. Specifically, when output voltage had decreased, when internal resistance has increased, or when the humidity of discharge gas has increased, the flow rate of oxidizing gas is increased, or its pressure increases, or the humidity of oxidizing gas is reduced. As a result, moisture inside the cell is removed and flooding and the resulting falls in output voltage are prevented. In addition, the generation of hydrogen gas in the passages for oxidizing gas is contained.

6 Claims, 9 Drawing Sheets ial FUEL CELL AND
THE METHOD OF CONTROLLING THE
OPERATION THEREOF

BACKGROUND OF THE INVENTION

1. Field of the Invention

This invention relates to a polyelectrolytic fuel cell capable of generating power by causing fuel gas react to oxidizing gas by means of a polyelectrolytic film.

2. Related Art

Polyelectrolytic fuel cells use cation exchange resin films as their electrolyte. This cation exchange resin films contain a proton (hydrogen ion) exchange base in its molecules, and is conductive. Their hydration to a quasi saturation level results in a relative resistance of 20 Ω·cm or less at normal temperature enabling them to function as an conductive electrolyte.

The saturated water contents of said polyelectrolytic film changes reversibly depending on temperature. In order to prevent the desiccation of said polyelectrolytic film, fuel gas and oxidizing gas are moisturized before they are supplied. Some moisture contained in said fuel gas and oxidizing gas sometimes condenses to form drops in the passage of gas. During the normal operation of the fuel cell, drops as well as water formed by electrochemical reactions on the side of the oxygen electrode are discharged outside. However, when the quantity of water formed on the side of the oxygen electrode exceeds that of water carried away by the oxidizing gas, it remains in the passage of the oxidizing gas in the form of drops and any drops remaining on the oxygen electrode result in so-called "flooding."

This flooding is a state of drops remaining on the surface (in particular a dispersion layer) of electrodes obstructing the dispersion of gas onto the surface of electrodes. In case of a light flooding where the water contents are relatively small, proportionately to a decrease in the surface of electrodes caused by water remaining thereon, output voltage decreases. However, it is highly possible that air passing through the passage of oxidizing gas carries away moisture and eliminate any flooding thereby and thus output voltage recovers naturally. When a large amount of drops remain on the surface of electrodes or there develops a flooding every time water remains in the passage of oxidizing gas, the surface of electrodes open for gas is substantially reduced. Thus, flooded cells obstruct the supply of oxidizing gas to the oxygen electrodes causing a sharp drop in their voltage, which in turn reduces the output of the whole cells to an insufficient level.

Furthermore, in an advanced stage of flooding, not only the supply of oxidizing gas to the oxygen electrodes is impeded causing a drop in voltage, a drop in the amount of oxygen reaching the oxygen electrodes causes protons ($H^+$) having passed through a polyelectrolytic film not to react with oxygen on the side of the oxygen electrode and to recombine with electrons (e−) to return to its original form of hydrogen gas ($H_2$). As a result, the mass of hydrogen gas increases rapidly and this hydrogen gas mixes with oxidizing gas flowing through the passage of oxidizing gas. Thus, the concentration of hydrogen gas resulting from this mixture increases to a highly inflammable level leading to a detonation. The gas mixture sometimes comes into contact with a reaction catalysis layer formed on the surface of the oxygen electrode and ignites to burn intensely.

The mechanism of inflammation in this fuel cell is described below by referring to FIGS. 12 through 14. FIG. 12 is a drawing illustrating the mechanism of mixing hydrogen gas on the cathode side, while FIG. 13 is a cross section of a conventional fuel cell in which a plurality of unit cells standing upright are stacked horizontally. FIG. 14 is a process flow chart starting with the generation of hydrogen gas to inflammation.

As shown in FIGS. 12 and 13, a unit cell 1a of a polyelectrolytic fuel cell 1 comprises an anode 3 comprising a reaction catalysis layer 3a and a gas dispersion layer 3b on the left side of an electrolytic film 2 and a cathode 4 comprising a reaction catalysis layer 4a and a gas dispersion layer 4b on the right side of said film 2. On the outside of said anode 3, a carbon current collector 5 concurrently serving as a gas separator is provided, and on the side of this carbon current collector 5 opposite to said gas dispersion layer 3b, a plurality of parallel fuel gas passages 5a are formed and in each fuel gas passage 5a a fuel gas, i.e. hydrogen gas circulates. On the outside of said cathode 4, a carbon current collector 6 concurrently serving as a gas separator is provided, and on the side of this carbon current collector 6 opposite to said gas dispersion layer 4b, a plurality of parallel oxidizing gas passages 6a (in the drawing only the forefront passage 6a is illustrated) are formed.

When this fuel cell 1 is operated, as the oxidizing gas passages 6a on the cathode 4 side are supplied with air containing oxygen ($O_2$), on the anode 3 side there occurs a reaction of

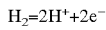

on the cathode side there occurs a reaction of

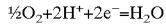

In other words, on the anode 3, hydrogen gas ($H_2$) flowing in the fuel gas passage 5a forms protons ($2H^+$) and electrons ($2e^-$). Protons moves through the electrolytic film 2 which is an ion exchange film towards the cathode 4, and electrons passes through an external circuit (not illustrated) from a carbon current collector 5 on the anode 3 side to move towards a carbon current collector 6 on the cathode side 4.

And on the cathode 4, oxygen contained in the air flowing in the oxidizing gas passage 6a, protons having moved from the anode 3 into the electrolytic film 2 and electrons having moved via external circuits react each other to form water ($H_2O$).

Therefore, water W thus formed in the oxidizing gas passage 6a in each unit cell 1a of the layer-built fuel cell flows down under the pull of gravity and is discharged outside together with excess oxidizing gas from the discharge manifold 7 connected with the lower end of the oxidizing gas passage 6a of each unit cell 1a of the layer-built fuel cell.

Since water thus in each unit cell 1a of the layer-built fuel cell flows down the oxidizing gas passages 6a to converge in the discharge manifold 7, on the outlet side of the discharge manifold 7 (right lower side on FIG. 13) water W tend to increase to stagnate near the outlet. And when water W stagnate near the outlet of the discharge manifold 7, in a unit cell 1a in which the lower end of the oxidizing gas passage 6a is kept open for this stagnating water, discharge is not correctly done and this leads to the stagnation of water W in the oxidizing gas passage 6a. As a result the cathode 4 is inundated causing a flooding of the gas dispersion layer 4b and the reaction catalysis layer 4a and obstructing the dispersion of oxygen gas to this reaction catalysis layer 4a.

Therefore, in a unit cell 1a in which water W in the oxidizing gas passage 6a is smoothly discharged, oxygen gas is supplied to the cathode 4 in a sufficient amount. As a result, there occurs a reaction of $$\tfrac{1}{2}O_2 + 2H^+ + 2e^- = H_2O$$

and no hydrogen gas ($H_2$) is formed (see the upper half of the oxidizing gas passage 6a of FIG. 12)

A continuous application of current in the state which the water W stagnates in the oxidizing gas passage 6a leads to an insufficient supply of oxygen gas to the cathode 4, causing a drop in the voltage obtained from the whole fuel cell 1. At the same time, no reactions forming $H_2O$ occurs in the unit cell 1a and proton ($2H^+$) having passed an electrolytic film 2 and electrons ($2e^-$) are recombined. As a result, hydrogen gas ($H_2$) is formed in this oxidizing gas passage 6a. (See the lower half of the oxidizing gas passage 6a of FIG. 12).

And hydrogen gas ($H_2$) resulting from an insufficient supply of oxygen due to inadequate discharge of water W rises in the oxidizing gas passage 6a of each unit cell 1a and gathers in the supply side of the manifold 8 connected in a manner enabling the supply of oxidizing gas to the top of oxidizing gas passage 6a of each unit cell 1a. It gathers particularly in large amount at the outlet side of the discharge manifold 7, near the farthest end downstream of the supply manifold 8 above the unit cells 1a to which the bottom of the oxidizing gas passages 6a are connected (the right top in FIG. 13). As a result, hydrogen gas stagnating in the supply manifold 8 gradually increases and when its concentration exceeds 4%, the reaction catalysis layer 4a of the cathode 4 serves as a source of ignition and hydrogen gas inflames thereby.

Thus, the inflammation of hydrogen gas in the passage of reaction gas in the fuel cell 1 raises the pressure in the passage and variations in the supply of reaction gas and other factors could result in an instability of voltage generated. In polyelectrolytic cells operated under normal temperature in particular, heat and rising pressure resulting from inflammation could cause variations in voltage generated and produce adverse effects on the seals and other parts of unit cells 1a of the fuel cell stack.

Therefore, it is necessary to control any increases in the concentration of hydrogen gas so that it may not burn intensely, and for this reason it is necessary to dissolve flooding water at its initial stage and to contain as much as possible any progress towards a state of massive generation of hydrogen gas.

In a fuel cell in which hydrogen gas is used as a fuel gas as described above, the flooding of oxygen electrodes with water is a cause of increasing concentrations of hydrogen gas in the passages of oxygen. Therefore, in the invention described in Japanese Patent Application Laid Open No. 54-144934 the flow velocity of the reaction gas is intermittently to increase the pressure difference of the reaction gas in the reaction gas passage, and the drops remaining in the reaction gas passage are eliminated. The adoption of such a method enables to prevent the blocking of gas passages with drops, in other words flooding thereof, to prevent any increase in the concentration of hydrogen gas on the side of oxygen electrodes due to the blocking of passages and thus to prevent possible inflammation of hydrogen gas.

However, in the conventional fuel cell mentioned above in which the flow of reaction gas is regularly increased to push out drops in the gas passages, even in cases where this is not required, the flow rate of reaction gas is increased. As a result, as the flow rate of reaction gas increases to create a sufficient difference of pressure for removing drops, the consumption of reaction gas increases, and following variations in the flow rate of reaction gas the output voltage of a fuel cell varies in a complex manner. Furthermore, in case of abrupt increases in the amount of water within a fuel cell, such water cannot be discharged completely and stagnating water in the passage caused a flooding to develop and progress. Thus, it was highly probable that no action could be taken to prevent a sharp increase in the mass of hydrogen gas developed on the oxygen electrode side.

In the polyelectrolytic fuel cell described above, it was necessary to prevent inflammation inside, in other words to prevent oxidizing gas from mixing in the fuel gas passage and to prevent fuel gas from mixing in the oxidizing gas passage, or remove early gas thus mixed in to prevent inflammation.

Therefore, various inventions have been made so far for example to evacuate efficiently water and to prevent its stagnation in order to prevent hydrogen gas from developing and mixing in the oxidizing gas passages of a fuel cell (See, for example, Japanese Patent Application Laid Open No. 5-251097). However, no attempt has been made so far to prevent inflammation resulting from the generation and mixing in of gas in fuel cells.

In addition, Japanese Patent Application Laid Open No. 4-167367 describes fuel cell equipment comprising cell stacks, a reaction gas pipe line designed to supply and evacuate reaction gas thereto and therefrom, a cell housing and an ambient gas system. In this invention, cell stacks are housed in a cell housing filled with ambient gas, a reaction gas pipe line is connected to these cell stacks and an ambient gas system is connected to said cell housing. In this fuel cell equipment, however, reaction gas (combustible component) having leaked from said cell stacks and mixed in ambient gas is removed by burning the same in the cell housing before it is discharged with ambient gas. For this reason, the art described in this patent application laid open does not enable to remove for example fuel gas that has mixed in the oxidizing gas passage within a fuel cell.

SUMMARY OF THE INVENTION

The main objective of this invention is to prevent any possible drop in the output voltage of polyelectrolytic fuel cells due to flooding.

Another objective of this invention is to prevent any explosive combustion of fuel gas within a polyelectrolytic fuel cell.

A further objective of this invention is to suppress any increase in the concentration of fuel gas contained in oxidizing gas in a polyelectrolytic fuel cell in order to prevent any possible inflammation of said fuel gas.

A further objective of this invention is to stabilize the output voltage of polyelectrolytic cells.

Therefore, the polyelectrolytic cell of this invention is provided with means to change the conditions of supplying oxidizing gas when at least any one of the following factors has deviated from the tolerance: the output voltage and the internal resistance of a plurality of stacked cells or the humidity of oxidizing gas being discharged. Specifically, when the output voltage has decreased, when the internal resistance has increased or when the humidity of discharge gas has increased, the flow rate of oxidizing gas is increased, or its pressure is increased or the humidity of oxidizing gas is reduced. As a result, the water contents in the cell is removed preventing flooding and any drops in the output voltage resulting therefrom. Further, the generation of hydrogen gas is suppressed in the passages of oxidizing gas.

In addition, this invention uses a chamber leading to the passages for oxidizing gas and an igniter designed to ignite the combustible gas contained therein to burn the same. When the concentration of fuel gas mixed in oxidizing gas has increased, therefore, the gas mixture can be collected in the chamber to burn there thus preventing any possible inflammation in the cell and any possible damages to the cell.

Moreover, as the polyelectrolytic fuel cell of this invention is provided with a combustion catalysis positioned somewhere in the passage of oxidizing gas, fuel gas mixed in oxidizing gas is oxidized by the catalysis, and as a result the concentration of fuel gas in oxidizing gas is kept at a low level.

The above and further objects and novel feature of this invention will more fully appear from the following detailed description when the same is read in connection with the accompanying drawings. It is to be expressly understood, however, that the drawings are for purpose of illustration only are not intended as a definition of the limits of the invention.

DETAILED DESCRIPTION OF THE PREFERRED EMBODIMENT

Figure 1:
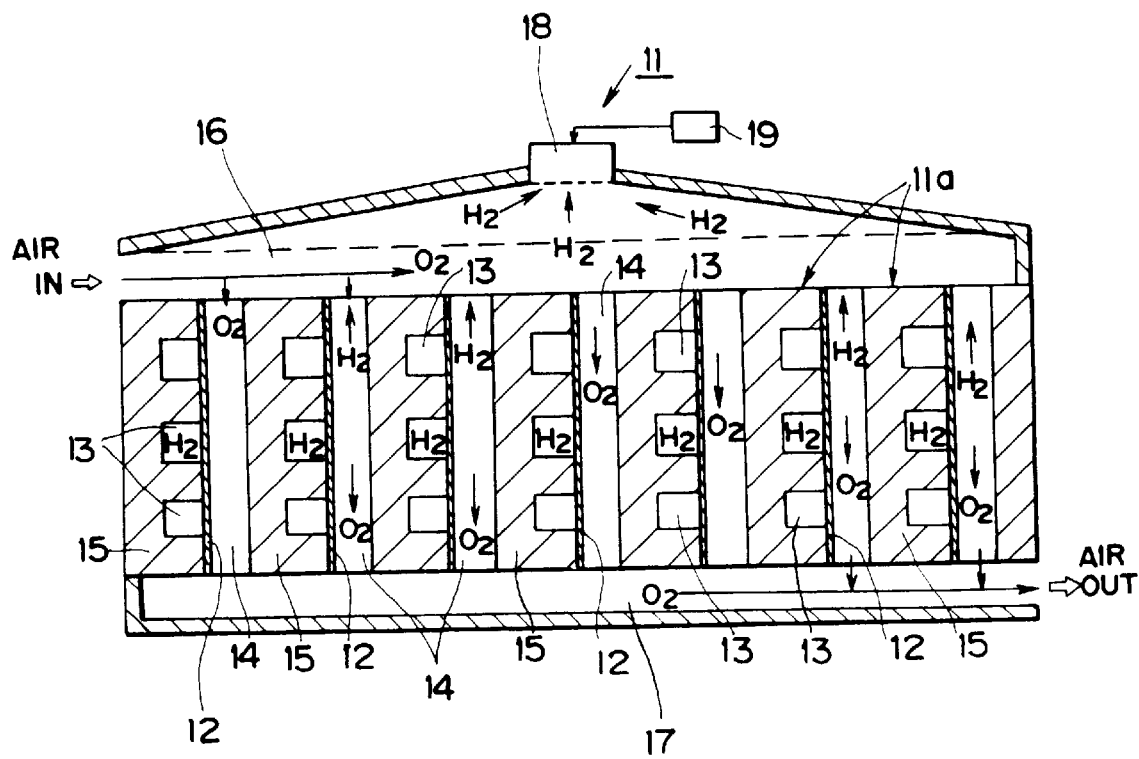
FIG. 1 is a schematic drawing of an example of fuel cell according to this invention.

To begin with, the construction of the polyelectrolytic fuel cell of this invention is described below. In FIG. 1, the fuel cell stack 11 comprises a plurality of unit cells 11a standing upright and stacked horizontally. Each unit cell 11a comprises a polyelectrolytic film 12 with a fuel electrode formed on one side (on the left-hand side in FIG. 1) and an oxygen electrode formed on the other side and a carbon current collector 15 serving concurrently as a gas separator with fuel gas passages 13 formed horizontally on one side and oxidizing gas passages 14 formed vertically on the other hand, a plurality of fuel gas passages 13 and oxidizing gas passages 14 being formed with a depth and width of approximately 1 mm at intervals of approximately 1 mm. And a plurality of unit cells 11a are stacked by sandwiching polyelectrolytic films 12 between these fuel gas passages 13 and oxidizing gas passages 14.

An end of the fuel gas passage 13 formed in a stack of unit cells 11a is connected with the supply manifold for fuel gas (not illustrated), and the other end is connected with the discharge manifold for fuel gas (not illustrated). The top end of the oxidizing gas passage 14 of each unit cell 11a is connected with the supply manifold 16 for oxidizing gas and the bottom end is connected with the discharge manifold 17 for oxidizing gas. And the whole system is constructed in such a way as to assure that oxygen gas contained in air supplied as oxidizing gas to the oxidizing gas passages 14 through the oxidizing gas manifold 16 and hydrogen gas supplied as fuel gas to the fuel gas passages 13 through the discharge manifold for fuel gas start an elecrochemical process of oxidizing reaction through the polyelectrolytic film 12.

It should be noted that, for this polyelectrolytic film 12, a fluoric cation exchange film 130 $\mu$m thick on the surface of which electrodes are formed by hot pressing is used. The electrodes are made of a basic material of carbon cloth (0.3 mm thick) on the surface of which a catalysis reaction layer and a gas dispersion layer are coated. These electrodes are hot pressed on the surface of the fluoric cation exchange film mentioned above under the conditions of 120° C.$\times$980.7$\times$ $10^4$ Pa (Pascal). The catalysis reaction layer is made of a material obtained by mixing Pt 20% carrier carbon 0.4 mg/cm$^2$ and a cation exchange resin in such a manner that the ratio of the carrier carbon may account for 50%, while the gas dispersion layer is made from a material based on carbon comprising 50% tetrafluoroethylene treated with this tetrafluoroethylene for water repellent.

The supply manifold 16 for oxidizing gas mentioned above is formed on a slope of the ceiling rising in the center, and at the peak center a chamber 18 is formed. In other words hydrogen gas in the oxidizing gas passages is automatically collected in this chamber 18, and an igniter 19 designed to ignite hydrogen gas so collected is provided in the chamber 18. For this igniter 19, a model that ignites hydrogen gas with spark discharge is adopted.

In the fuel cell stack 11 constructed as mentioned above, in order to keep the polyelectrolytic film 12 of each unit cell 11a hydrated to saturation so that it may function as a proton conductive electrolyte with a relative resistance of 20 Ω·cm or less, water vapor is mixed respectively in hydrogen gas supplied through the fuel gas passages 13 and air supplied through the oxidizing gas passages 14 to keep the polyelectrolytic film 12 moist.

When air containing oxygen ($O_2$) is supplied in the oxidizing gas passages 14, on the fuel electrodes on the side of fuel gas passages 13, there occurs a reaction of $$H_2 = 2H^+ + 2e$$

and on the oxygen electrodes on the side of oxidizing gas passages 14, there occurs a reaction of $$\tfrac{1}{2}O_2 + 2H^+ + 2e = H_2O$$

In other words, on the side of fuel electrodes hydrogen gas ($H_2$) flowing through the fuel gas passages 13 is ionized into protons ($H^+$) and electrons (e ). Ionized protons move through a polyelectrolytic film 12 which is an ion exchange film towards the oxygen electrode, and electrons move from the carbon current collector 15 on the fuel electrode side to the carbon current collector 15 on the oxygen electrode side by passing through an external circuit (not illustrated). And on the oxygen electrode oxygen contained in air flowing through the oxidizing gas passage 14, protons having moved through the polyelectrolytic film 12 from the fuel electrode, and electrons having moved through external circuits react each other to form water ($H_2O$).

The general configuration of the fuel cell generation system incorporating the fuel cell stack 11 mentioned above is illustrated in FIG. 2 in the form of a block diagram. Between the output terminals 21 and 22 of the fuel cell stack 11, a load L is connected through a relay contact 20, and at the same time a computer control device 23 designed to control the operation of the fuel cell is connected in parallel with the load L mentioned above. This computer control device 23 monitors constantly the output voltage and current of the fuel cell stack 11. At the same time it connects an A.C. source between the two output terminals 21 and 22 mentioned above to add an A.C. voltage to the D.C. voltage outputted by the fuel cell stack 11 in order to detect the A.C. constituent i contained in the current flowing in the unit cells and to find an A.C. resistance z from the formula $z=e/i$.

In the fuel cell stack 11, at the induction side end of its supply manifold 16 for oxidizing gas (at the left-hand end in FIG. 2), an end of an oxidizing gas supply pipe line 25 the other end of which is connected to an air supplier 27 is connected. At the induction side of the supply manifold for fuel gas (not illustrated), an end of the fuel gas supply pipe line 26 the other end of which is connected with a hydrogen gas supplier 28 is connected. On this oxidizing gas supply pipe line 25 and the fuel gas supply pipe line 26, from the side of the air supplier 27 and the hydrogen gas supplier 28 mentioned above, pressure regulating valves 29 and 29a, mass flow controllers 30 and 30a, humidifiers 31 and 31a, closing valves 32 and 32a and thermometers/hygrometers 33 and 33a are provided in the order.

Figure 2:
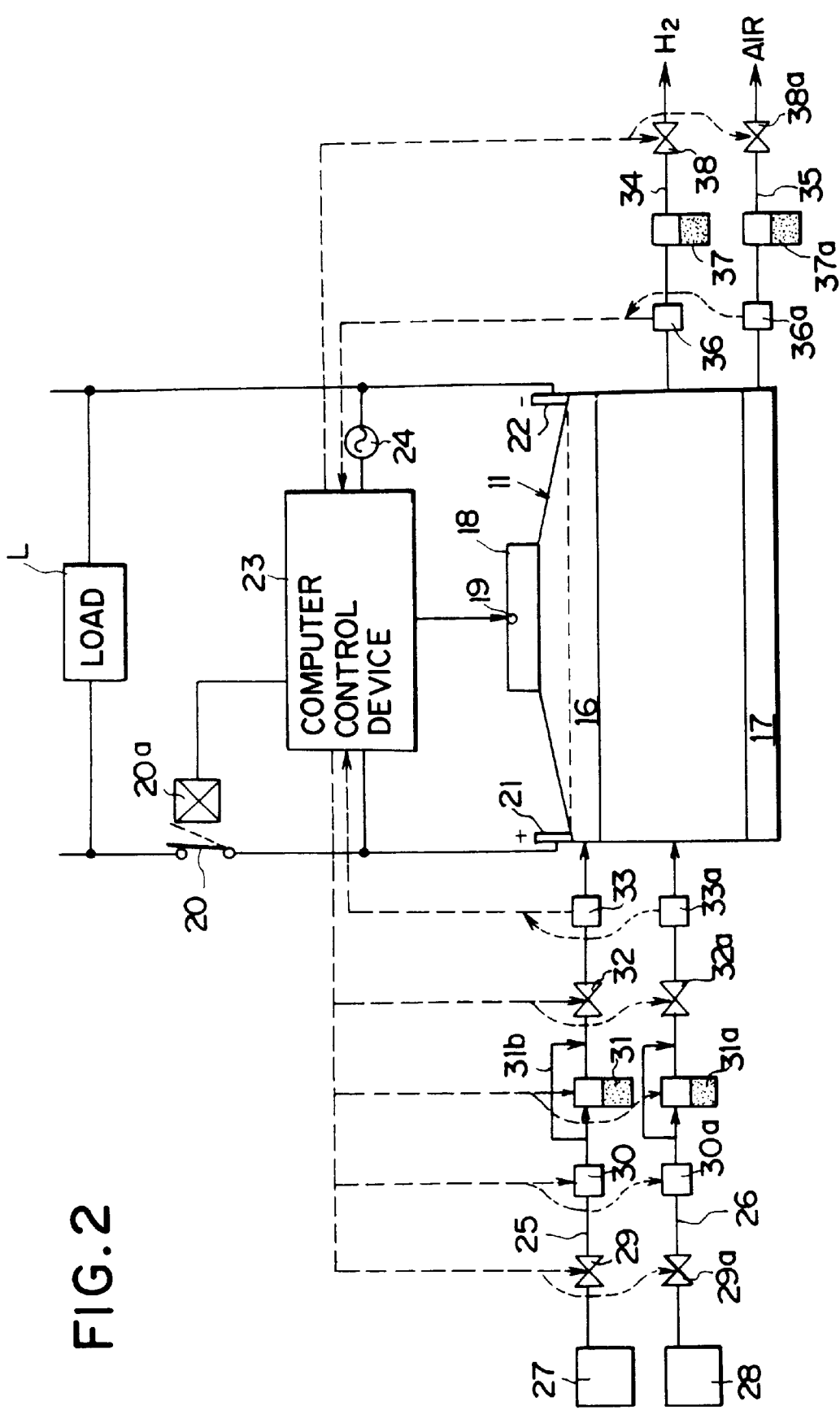
FIG. 2 is a block diagram showing the general configuration of the system using this fuel cell.

At the right-hand end of FIG. 2 showing the fuel cell stack 11, a fuel gas discharge pipe line 34 connected with the discharge side of the discharge manifold for fuel gas not illustrated and a oxidizing gas discharge pipe line 35 connected with the discharge side of the discharge manifold 17 for oxidizing gas are provided. On these fuel gas discharge pipe line 34 and oxidizing gas discharge pipe line 35, thermometers/hygrometers 36 and 36a, condensers 37 and 37a and pressure regulating valves 38 and 38a are provided in the order indicated from the manifold side. And the temperature/humidity information of gases measured by the thermometers/hygrometers 33 and 33a provided respectively on the oxidizing gas supply pipe line 25 and the fuel gas supply pipe line 26 and the thermometers/hygrometers 36 and 36a respectively provided on the oxidizing gas discharge pipe line 34 and the fuel gas discharge pipe line 35 at the respective positions are constantly inputted in the computer control device.

And when the output voltage, current and the internal resistance of the fuel cell stack 11 and the information provided by the thermometers/hygrometers 33, 36 altogether indicate the start of flooding on the fuel cell stack 11, the computer control device 23 sends signals to the humidifiers 31 and 31a and other equipment on the oxidizing gas supply pipe line 25 and the fuel gas supply pipe line 26 and the pressure regulating valves 38 and 38a and other equipment on the oxidizing gas discharge pipe line 34 and the fuel gas discharge pipe line 35 to control any drops in output voltage and any possible development of flooding.

Figure 3:
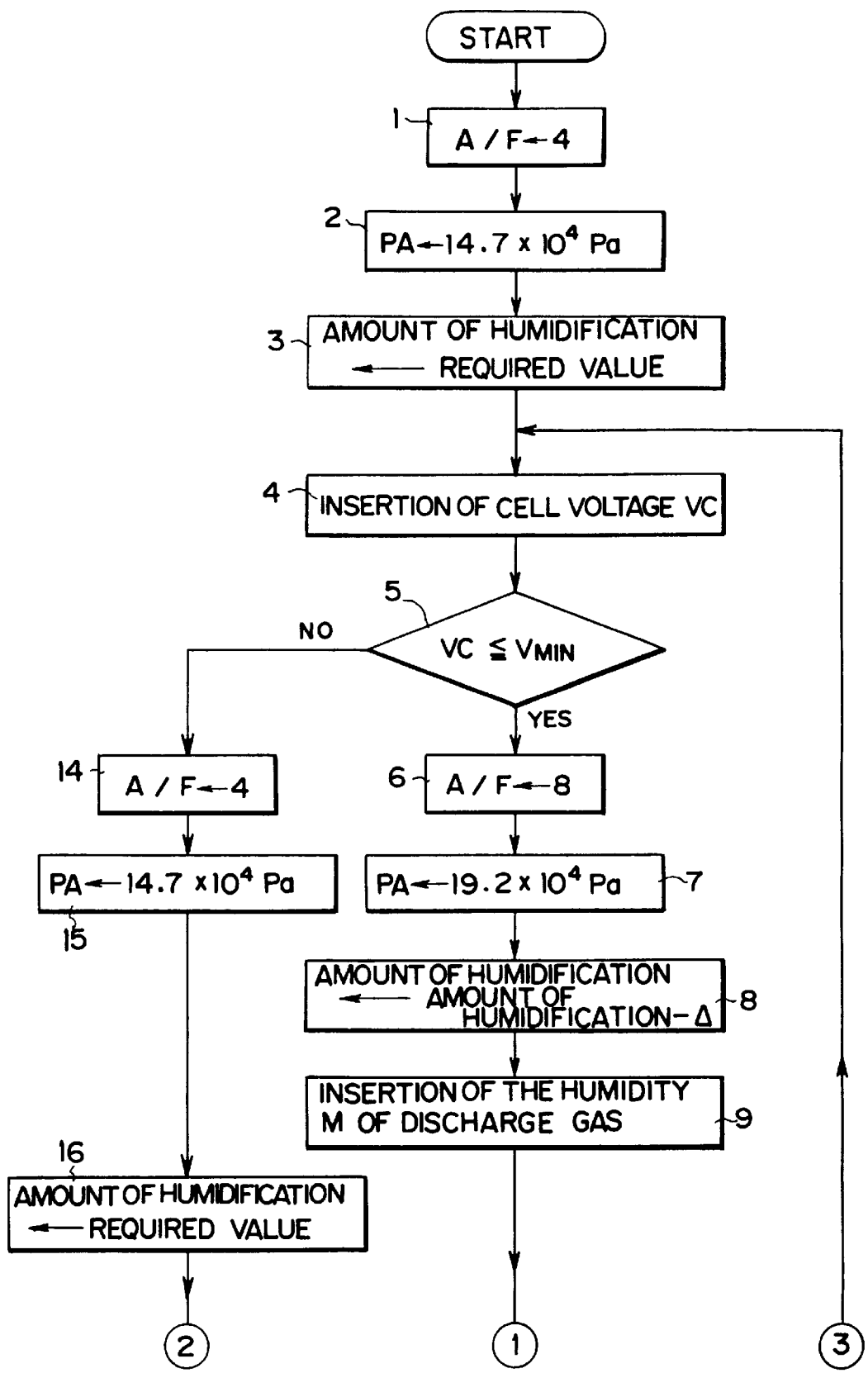
FIG. 3 is a chart showing a part of a flow chart describing a control routine executed in the system described above.
Figure 4:
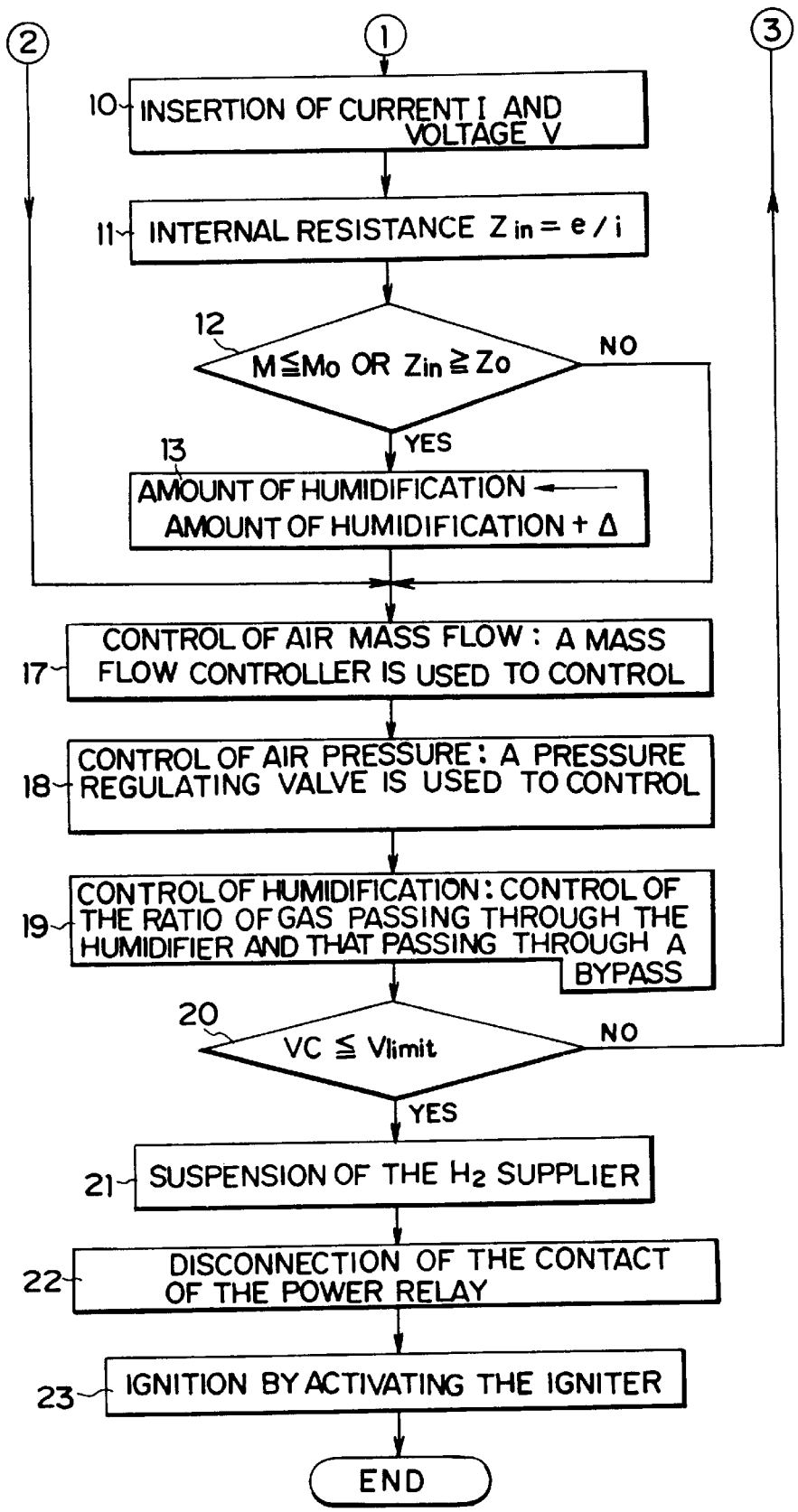
FIG. 4 is a chart showing another part of the flow chart mentioned above.

The following is a description of its control routine. FIGS. 3 and 4 are a flow chart illustrating an example thereof. These charts are two sections of a flow chart, divided for the convenience of drawing, and encircled figures show that the lines of the same figures are linked.

After the initial settings, at Step 1, the amount of air supply A is set such that the ratio of air to fuel gas (A/F ratio) will be 4, and at Step 2, the air pressure PA is set at $14.7 \times 10^4$ Pa. And at Step 3, the amount of humidification is set at a predetermined value. This is due to the use of air as the oxidizing gas requiring a compensation of a low partial pressure of oxygen in the air.

After the fuel cell stack 11 is operated under the conditions given above and the output voltage VC of the unit cell 11a are read at Step 4, the output voltage VC and minimum value Vmin of normal voltage are compared. If a result of this comparison is VC≦Vmin, it is considered that oxygen is insufficient. Therefore, at Step 6 the amount of air supply is increased until the ratio of air to fuel gas reaches "8" (=A/F). Furthermore, at Step 7 the pressure of air supply PA is raised to $19.2 \times 10$ Pa. And at Step 8 the amount of humidification is reduced (amount of humidification−Δ). Therefore, Step 5 corresponds to the means of detection in this invention, and Steps 6 to 8 correspond to the means of controlling the supply of oxidizing gas in this invention.

And the fuel cell stack 11 is operated under these condition and at Step 9 the humidity of the discharge gas shown by the thermometer/hygrometer 36 at the outlet of the discharge manifold for oxidizing gas is inserted.

Then at Step 10, the current I and voltage V outputted from the fuel cell stack 11 are inserted, and at Step 11 the value of internal resistance ZIN, or [a.c. voltage e/a.c. current i] is sought. And at Step 12, the humidity of discharge gas M and its reference value M0 are compared and the internal resistance ZIN and its reference value Z0 are also compared. As a result of these comparisons, if the humidity of the discharge gas M is found to be equal to or less than the reference value M0 (M≦M0), or if the internal resistance ZIN is equal or more than the reference value Z0 (ZIN≧Z0), it is judged that the percentage of moisture content of the polyelectrolyte 12 has decreased and that resistance has increased, and at Step 13 the amount of humidification is increased (amount of humidification+Δ). In other words, the humidification reset control switch is turned on in order to avoid excessive dryness of the polyelectrolyte 12. Then comes Step 17.

On the other hand, as a result of the comparison of the output voltage VC and the minimum value Vmin of normal voltage at Step 5 described above, if the output voltage is greater (VC>Vmin), the amount of air supplied is considered sufficient, and at Step 14 the ratio of air-fuel gas is maintained at "4", and at Step 15 the pressure of air supply PA is maintained at $14.7 \times 10$ Pa. Then at Step 16 the amount of humidification is maintained at the predetermined value and then one proceeds to Step 17.

At Step 12 mentioned above, as the result of comparisons of the humidity of the discharge gas M and the internal resistance ZIN with their respective reference values M0 and Z0, if M>M0 or ZIN>Z0, the amount of humidification is considered adequate, and then follows Step 17.

And at Step 17, the computer control device 23 sends signals to the mass flow controllers 30 and 30a to control the amount of air supplied so that the latter may be equal to a newly set value. Then at Step 18, signals are sent to the pressure regulating valves 29 and 38$a$ to control the pressure of air supply so that the latter may be equal to a newly set value. And at Step 19, signals are sent to the humidifier 31 to regulate the ratio of oxidizing gas having passed through the humidifier 31 to that having passed through a bypass pipe 31$b$ so that the amount of humidification may be equal to a newly set value.

And at Step 20, the output voltage VC and the limit of operation voltage V limit are compared, and if the output voltage is greater (VC>Vlimit), the whole system is considered as being operated adequately, and then returns to Step 4 where the control steps described above are repeated.

On the other hand, as a result of comparison of the output voltage VC and the limit of operation voltage Vlimit (approximately 0.12 volt) at Step 20 described above, if the output voltage VC is equal to or less than the limit of operation voltage Vlimit, an anomaly is considered to have occurred. And at Step 21, signals are sent to the valve 32$a$ provided on the hydrogen gas supply pipe line 26 to close the valve 32$a$ and to stop the supply of fuel gas. And at Step 22 the relay coil 20$a$ is switched on to open the relay switch 20 cutting off the power to the load L.

Now the computer control device 23 ignites the igniter 19 (Step 23) to generate a spark in the chamber 18 of the supply manifold 16 for oxidizing gas burning hydrogen gas collected in this chamber 18.

Therefore in the operation method shown by the control routine described above, a drop in the output voltage VC to a level below the reference voltage Vmin leads to changes in the amount of air supplied, pressure and humidity of air serving as the oxidizing gas preventing any further drops in the output voltage. In other words, an increase in the amount of air supplied accelerates the dispersion of oxygen on the surface of electrodes enhancing the reaction of oxygen with hydrogen and thus increasing the generating capacity of the fuel cell. An increase in moisture content carried away by air serves to reduce excessive moisture on the surface of electrodes, which accelerate the reaction of hydrogen with oxygen and therefore increase the generating capacity of the cell. And a higher pressure of air raises the partial pressure of oxygen on the surface of electrodes accelerating likewise the dispersion of oxygen on the surface of electrodes, and the resulting increase in the reaction of oxygen with hydrogen increases the generating capacity of the fuel cell.

In addition to these controls, a drop in the moisture content of oxidizing gas enables to reduce gradually any excessive humidity in the fuel cell which seems to be the cause of a drop in the output voltage. As a result, the output voltage immediately or gradually recovers and a sudden generation of hydrogen gas due to falling voltage can be prevented well in advance.

Therefore, according to this embodiment, in a system for generating electric power, a polyelectrolytic fuel cell 11 has a plurality of stacked unit cells 11$a$ capable of generating electric power by causing chemical reactions between a fuel gas and an oxidizing gas through a polyelectrolytic film. An oxidizing gas supply line 25 has an oxidizing gas control device, such as the valves 29 and 32, the mass flow controller 30 and the humidifier 31, which controls a characteristic of the oxidizing gas being supplied to the fuel cell, such as the supply rate of the oxidizing gas, the pressure of the oxidizing gas and the humidity of the oxidizing gas. An output voltage detector L is positioned to determine an output voltage VC of the electric power generated by the fuel cell, and a controller 23 has first means (Step 5) for comparing the determined output voltage VC to a predetermined voltage $V_{MIN}$ corresponding to flooding of the fuel cell, and for controlling said characteristic of the oxidizing gas being supplied to said fuel cell, when the comparison indicates the presence of flooding, such that the flooding tends to diminish (Steps 6 through 8). Further, a second means (Step 20) compares the determined output VC voltage to a predetermined voltage $V_{limit}$ corresponding to a fuel gas in a highest position of the fuel cell reaching combustion conditions, and means (Steps 21 and 23) are provided for respectively shutting off a supply of the fuel gas, and igniting the fuel gas, when the comparison indicates the presence of the combustion conditions. Means are also provided for determining the internal resistance of said fuel cell and the humidity of oxidizing gas being discharged from the fuel cell, for comparing the determined internal resistance or humidity to a predetermined internal resistance or humidity (Step 12), and for controlling the humidity of the oxidizing gas being supplied to said fuel cell as a function of the comparisons (Step 13).

Figure 5:
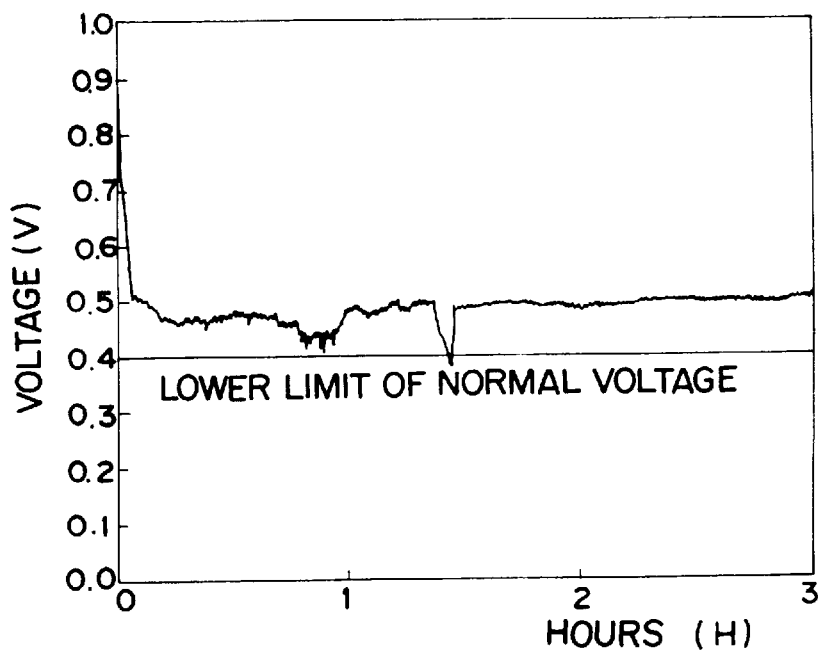
FIG. 5 is a diagram showing the voltage behavior of a fuel cell system operated consecutively by the control system mentioned above.

FIG. 5 is a diagram showing the behavior of voltage when the fuel cell stack 11 is continuously operated to generate electricity at a current density of 0.7 $A/cm_2$ by means of operation control of a programmed computer control device 23. When the output voltage V of unit cells 11$a$ declines to somewhere near 0.4 V, the lower limit of normal voltage, due to the presence of drops on the gas dispersion layer of oxygen electrodes, the mass of air supplied is increased from A/F=4 to A/F=8, and the pressure of air supply is raised from PA=14.7×$10^4$ Pa to PA=19.2×$10^4$ Pa, and the amount of humidification of air supplied is regulated towards dry side within a range consistent with the range of adequate values. This causes the mass of oxygen supplied to the oxygen electrodes to increase and causes the capacity to carry away moisture in the oxygen gas passage to improve. Thus any possible flooding is dissolved before the output voltage drops to the limit of operation voltage (0.12 V) and the output voltage recovers and remains within a range of normal voltage. Thus it will be understood that stable output voltage has been secured.

The operation control method of this embodiment as described above detects any flooding at the initial stage of development and enables to take appropriate measures to dissolve such flooding. Therefore, it improves the stability of voltage during the operation of the fuel cell and enables to prevent any sudden increase of hydrogen gas and therefore enables to prevent the deterioration of the performance of unit cells due to the heat and rising pressure resulting from the intense combustion of hydrogen gas in the fuel cell.

It should be noted here that the minimum normal voltage Vmin of 0.4 V and the limit of operation voltage Vlimit of approximately 0.12 V were set for the following reasons. When water formed or condensed in the oxidizing gas passage 14 increases and attaches to the gas dispersion layer of the oxygen electrodes, the supply of oxygen to the oxygen electrodes is impeded and so-called flooding occurs. In case of a light flooding, the effect will be limited to decreased supply of oxygen to the oxygen electrodes and some decreased in the output voltage. When flooding becomes more serious, however, the gas dispersion layer is completely covered with water and the reaction catalysis layer of the oxygen electrodes is almost completely cut off from the supply of oxygen. Therefore, protons having moved to the oxygen electrodes recombine with electrons to form hydrogen gas. It was found that the amount of hydrogen gas thus formed suddenly increases when the state of flooding progressed to a certain stage and when output voltage has decreased.

Figure 6:
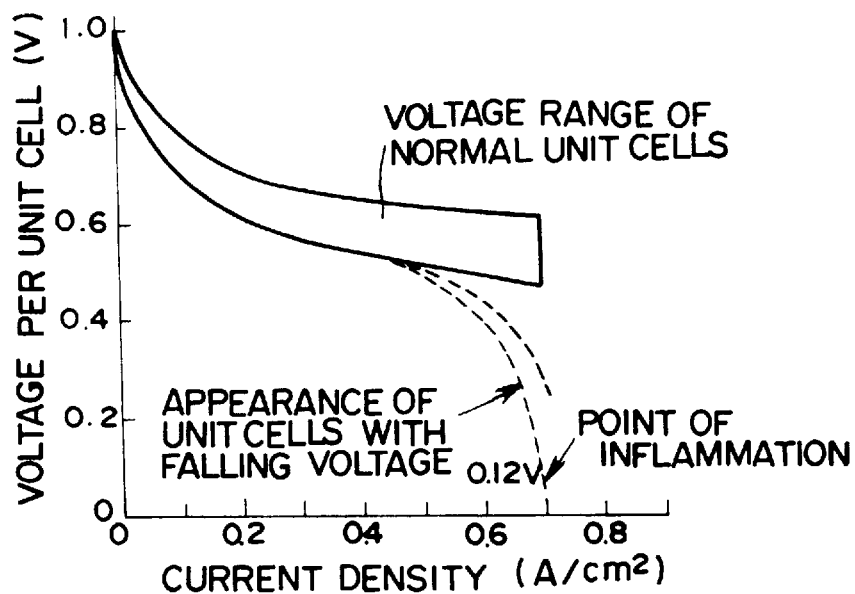
FIG. 6 is a diagram showing the result of performance tests with variable current carried out to study the point of sharp increase of hydrogen gas generated as a result of flooding.
Figure 7:
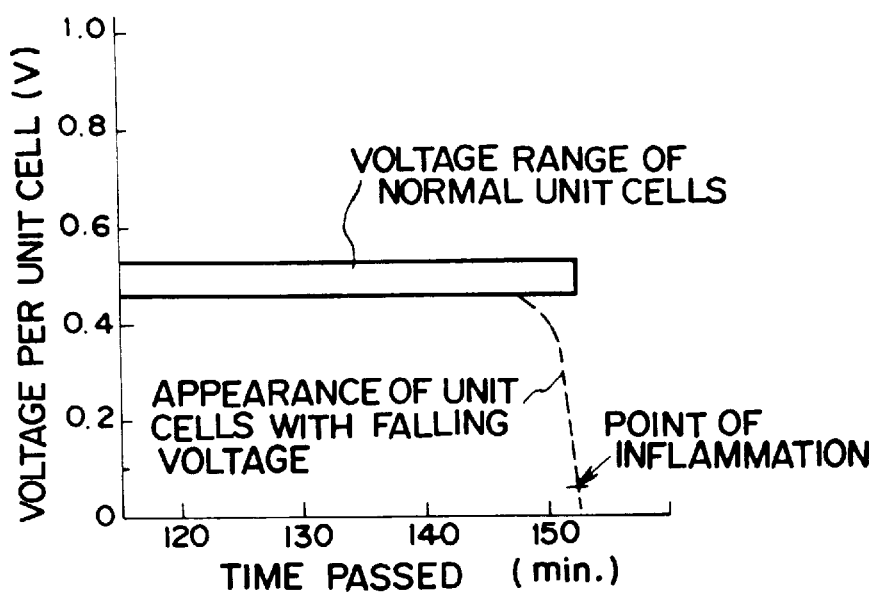
FIG. 7 is a diagram showing the result of continuous tests with fixed current carried out to study the point of sharp increase of hydrogen gas generated as a result of flooding.

In order to identify the state of flooding in which the mass of hydrogen gas formed suddenly increases by the output voltage of unit cells, variable current performance tests and fixed current continuous tests of unit cells were conducted. As a result, it was found that, as shown in FIGS. 6 and 7, when the state of flooding has progressed and the voltage of weakened unit cells has decreased to equal to or less than 0.12 V, hydrogen gas increases sharply to reach an inflammable ratio of mixture and ignites upon coming in contact with the reaction catalysis layer of electrodes. For this reason, in the embodiment described above, the limit of operation voltage for the output voltage of unit cells was set at 0.12 V.

On the other hand, regarding falls in output voltage constituting the cause of floodings, when output voltage begins to fall to a certain extent as operation continues, output voltage tends to fall sharply thereafter. Therefore, any control to avoid reaching the limit of operation voltage mentioned above must be executed at a time when such a sharp fall in the voltage does not occur. Experiments show that the limit value for such a sharp fall in the voltage is approximately 0.4 V for the output voltage of unit cells. As shown in FIG. 7, it is possible to recover voltage and prevent in advance the sudden generation of hydrogen gas resulting from falls in the voltage by controlling oxidizing gas based on this limit voltage as mentioned above.

It should be noted that, in the embodiment described above, a condition for starting the control procedure for increasing the supply of oxidizing gas, for increasing the pressure thereof or for reducing humidity thereof was the fall of the output voltage VC to equal to or less than the previously set minimum value of voltage Vmin. This is due to the fact that the output voltage VC reflects the state of flooding. However, there are other parameters that reflect the state of flooding. For example, increasing internal resistance and rising humidity of discharge gas of oxidizing gas are used as parameters for identifying the state of flooding. Therefore, in this invention, instead of falls in output voltage of unit cells, these increases in internal resistance and humidity of discharge gas may be adopted as the basis of controlling the flow rate or pressure of oxidizing gas.

In contrast with the embodiment described above in which the flow rate, pressure and humidity of oxidizing gas are controlled altogether, in this invention, flow rate or pressure may be separately controlled or either one of these and humidity may be controlled together.

In order to prevent explosive combustion of hydrogen gas in the oxidizing gas passage, it is preferable, in addition the means described above, to oxidize and remove a low concentration of hydrogen gas in the oxidizing gas passage and contain any increase of its concentration. An example is indicated below.

Figure 8:
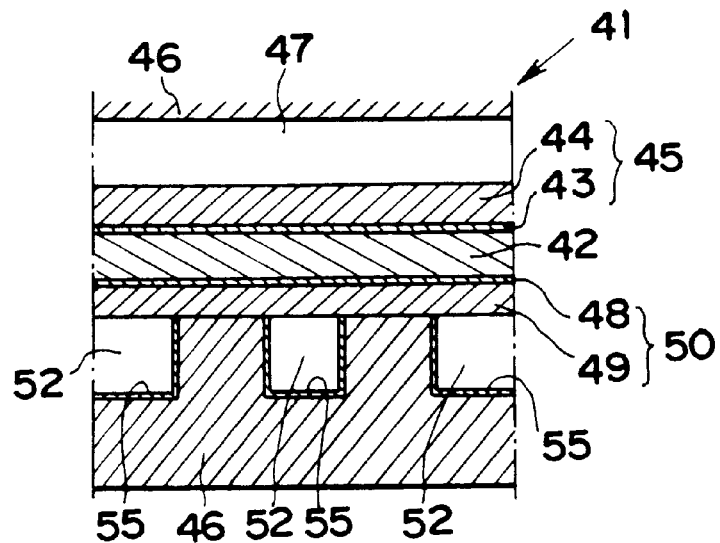
FIG. 8 is a top sectional view showing a part (unit cell) of fuel cell of another embodiment of this invention.
Figure 9:
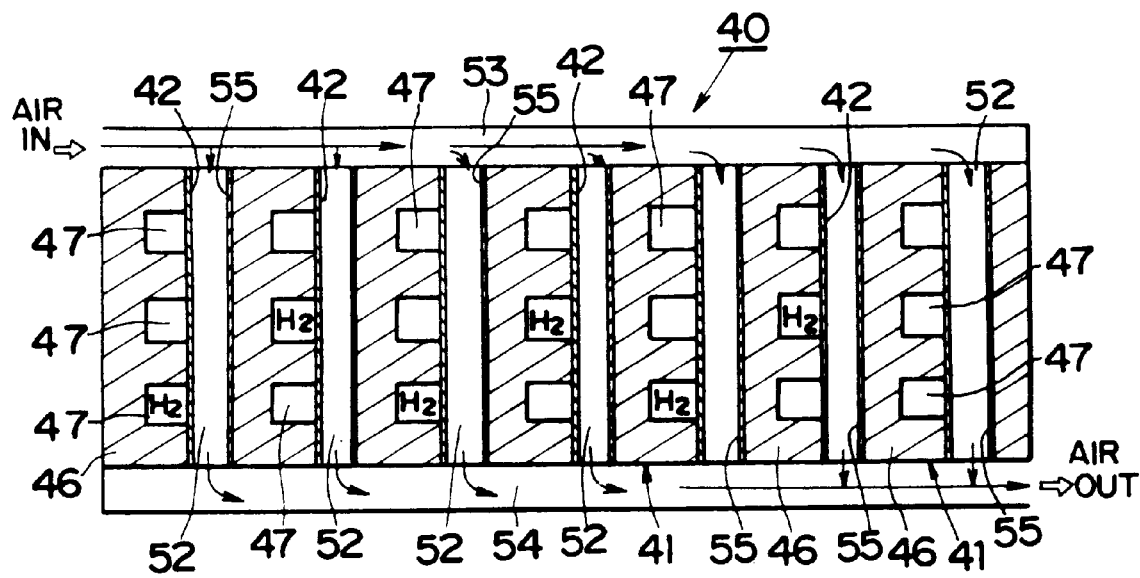
FIG. 9 is a cross sectional view showing said fuel cell.

In FIGS. 8 and 9, the fuel cell 40 comprises a plurality of unit cells 41 respectively standing vertically and stacked horizontally, each unit cell 41 comprising a polyelectrolytic film 42 on one side of which (on the upper side in FIG. 8) an anode (fuel electrode) 45 comprising a catalysis reaction layer 43 and a gas dispersion layer 44 on its outside are formed, and on the outside of this anode 45 a carbon current collector 46 serving concurrently as a gas separator made of a gasproof plate is provided in close contact. And on the surface in close contact with the anode 45 of the carbon current collector 46, a plurality of passages for fuel gas 47 in which hydrogen gas ($H_2$) serving as fuel gas flows are formed with a depth of 1 mm, width of 1 mm and at intervals of 1 mm.

On the other side of the polyelectrolytic film 42 mentioned above (lower side in FIG. 8), a cathode (oxygen electrode) 50 comprising a catalysis reaction layer 48 and a gas dispersion layer 49 on its outside is formed. On the outside of this cathode 50, a carbon current collector 46 serving concurrently as a gas separator and formed in the form of a plate is provided in close contact. And on the surface in close contact with the cathode 50 of the carbon current collector 46, a plurality of oxidizing gas passages 52 in which air serving as oxidizing gas flows in a direction orthogonal to the direction of formation of the fuel gas passages 47 mentioned above are formed to constitute a unit cell 41.

And this unit cell 41 is stacked horizontally in a plurality of layers so that the oxidizing gas passages 52 mentioned above may be vertical, and the top end of the oxidizing gas passage 52 in each stacked unit cell 41 is each connected with the oxidizing gas supply side manifold 53 while the bottom end of each oxidizing gas passage 52 is each connected with the discharge side manifold 54. And the upstream side and the downstream side of each fuel gas passage 47 are, although not illustrated, connected with the supply side manifold and the discharge side manifold of fuel gas.

It should be noted further that the polyelectrolytic film 42 described above is formed in a similar way to the polyelectrolytic film 42 of the embodiment illustrated in FIGS. 1 and 2.

And the inside wall of each oxidizing gas passage 52 formed in the carbon current collector 46 are coated or impregnated with Pt catalysis carrier liquid (for example, dinitrodiamine platinum, hexaammine platinum chloride, platinic chloride acid six hydrates) for carrier treatment to form a combustion catalysis layer 55.

The working of the fuel cell 40 mentioned above is described below. The fuel gas passage 47 on the anode 45 side is supplied with hydrogen gas ($H_2$). And the polyelectrolytic film 42 is hydrated to saturation to serve as a proton conductive electrolyte with relative resistance equal to or less than 20 $\Omega \cdot cm$ at normal temperature, and for this purpose hydrogen gas supplied through the fuel gas passage 47 and air supplied through the oxidizing gas passage 52 are mixed with vapor to keep the polyelectrolyte 42 moist.

And when the oxidizing gas passage 52 on the cathode 50 side is supplied with air containing oxygen ($O_2$), on the anode 45 side, there occurs a reaction of

$H_2 = 2H^+ + 2e$ and on the cathode 50 side, there occurs a reaction of

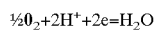
$\frac{1}{2}O_2 + 2H^+ + 2e = H_2O$

In other words, on the anode 45, hydrogen gas ($H_2$) flowing through the fuel gas passage 47 forms protons ($2H^+$) and electrons ($2e$). Protons move through the polyelectrolytic film 42 which is an ion exchange film towards the cathode 50, and electrons move from the carbon current collector 46 on the anode 45 side through an external circuit (not shown) to the carbon current collector 46 on the cathode 50 side.

And on the cathode 50, oxygen contained in air flowing through the oxidizing gas passage 52, protons having moved through the polyelectrolytic film 42 from the anode 45 and electrons having moved through an external circuit react among themselves to form water ($H_2O$).

Then, in order to study the effect of the formation of a combustion catalysis layer 55 inside this oxidizing gas passage 52, oxidizing gas (air, $O_2$) in which 1% of hydrogen gas ($H_2$) was mixed was supplied from the supply side manifold 53, and the concentration of $H_2$ contained in the discharge gas recovered near the outlet of the discharge side manifold 54 was measured with a gaschromatograph. As a result, it was confirmed that the concentration can be reduced to less than 100 ppm (0.01%).

Therefore, in a fuel cell 40 shown in FIGS. 8 and 9, even if hydrogen gas has mixed in the oxidizing gas passage 52 due to a discharge problem of water during operation, it is oxidized upon coming in contact with the combustion catalysis layer 55 formed inside the oxidizing gas passage 52 enabling to keep constantly the concentration of $H_2$ below the explosion lower limit of 4%. Thus, it is possible to eliminate adverse effects of combustion to the fuel cell 40 by burning mildly at the normal pressure while the concentration of $H_2$ is low.

It should be noted in this connection that, in the embodiment previously described, the case of forming a combustion catalysis layer 55 inside the oxidizing gas passage 52 was described. However, the formation of a combustion catalysis layer 55 within the supply side manifold 53 and the discharge side manifold 54 connected with this oxidizying gas passage 52 produces a similar effect.

Figure 10:
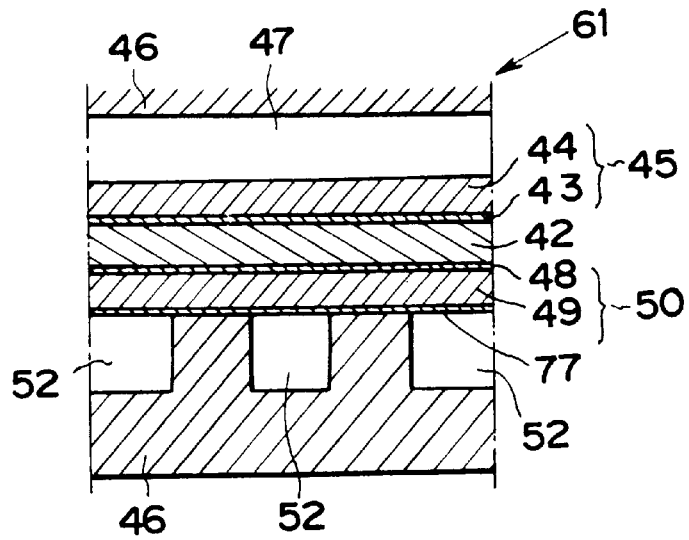
FIG. 10 is a top sectional view showing a still another embodiment of this invention.

FIG. 10 illustrates another embodiment in which a fuel catalysis layer is provided. In the embodiment described above, a combustion catalysis layer was formed inside the oxidizing gas passage. In this embodiment, however, a combustion catalysis layer is formed on the surface of the cathode facing the oxidizing gas passage. It should be further noted that the components identical to those used in the embodiment described above are marked with identical reference numerals and detailed descriptions thereon are omitted.

In FIG. 10, unit cells 61 forming part of the fuel cell has an anode 45 comprising a catalysis reaction layer 43 and a gas dispersion layer 44 on one side (upper side in FIG. 10) of its polyelectrolytic film 42, and on the outside of this anode 45 a carbon current collector 46 is provided in close contact thereto. Furthermore, on the side of this carbon current collector 46 facing the anode 45, fuel gas passages are provided. On the other side of the previously described polyelectrolytic film 42, a cathode 50 is formed comprising a catalysis reaction layer 48 and a gas dispersion layer 49. On the outer surface of this cathode 50, a combustion catalysis layer 77 is provided. Further, on the outside of this cathode 50, a carbon current collector 46 is provided and on the side of this carbon current collector 46 facing the cathode 50, oxidizing gas passages 52 are formed.

And, the combustion catalysis layer previously described 77 is formed by coating a water repellent agent containing tetrafluoroethylene on the surface of carbon carrying $H_3Pt(SO_3)_2OH$ sol made from hexahydroxine platinic acid by the carbon black colloid dispersion method (Plototech method).

And, the horizontal stacking of unit cells 61 formed as described above in such a way that the oxidizing gas passages 52 may be formed vertically as they were in the embodiment previously described and the connection of manifolds to each of gas passages to form the fuel cell and the operation of the same as it was in the embodiment previously described provide the required generating capacity.

Now, in order to test the effectiveness of preventing ignition of this embodiment, fuel gas and oxidizing gas of $H_2$/air (theoretical ratio×2) both fully humidified by means of a bubbler were introduced into the fuel cell formed by stacking unit cells 61 previously described to keep it in a high current density area (0.7 A/cm$^2$) in which a large amount of water is formed and in this condition the fuel cell was operated. As a result, within several tens of minutes of continuous operation, the catalysis reaction layer 48 was flooded, and the reaction did not progress satisfactory. Therefore, voltage dropped momentarily and $H_2$ developed in the oxidizing gas passage 52. However, upon coming in contact with the combustion catalysis layer 77 formed facing the oxidizing gas passage 52, $H_2$ instantly oxidizes. Thus it was confirmed that the mixing of a large amount of $H_2$ in oxidizing gas can be prevented.

Therefore, according to this embodiment, even if hydrogen gas mixes and stagnates in the oxidizing gas passage 52 of the fuel cell, upon coming in contact with the combustion catalysis layer 77 formed on the surface of the cathode 50 hydrogen gas burns so that the concentration of $H_2$ may be constantly maintained equal to or less than 4%, the lowest explosion limit. Therefore, the mild combustion at normal pressure while the concentration of $H_2$ is low can remove any adverse effects of combustion to the fuel cell. It should be noted that, in the case of this embodiment, no cation exchange resin added to the catalysis reaction layer 48 of the cathode 50 need not be added because no proton conductivity is required.

And although in the embodiment previously described the case of forming the combustion catalysis layers 57 and 77 either inside the oxidizing gas passage 52 or on the surface of the cathode 50 facing this oxidizing gas passage 52 was described, it is possible to form the same both inside the passage and on the surface of the cathode 50.

Figure 11:
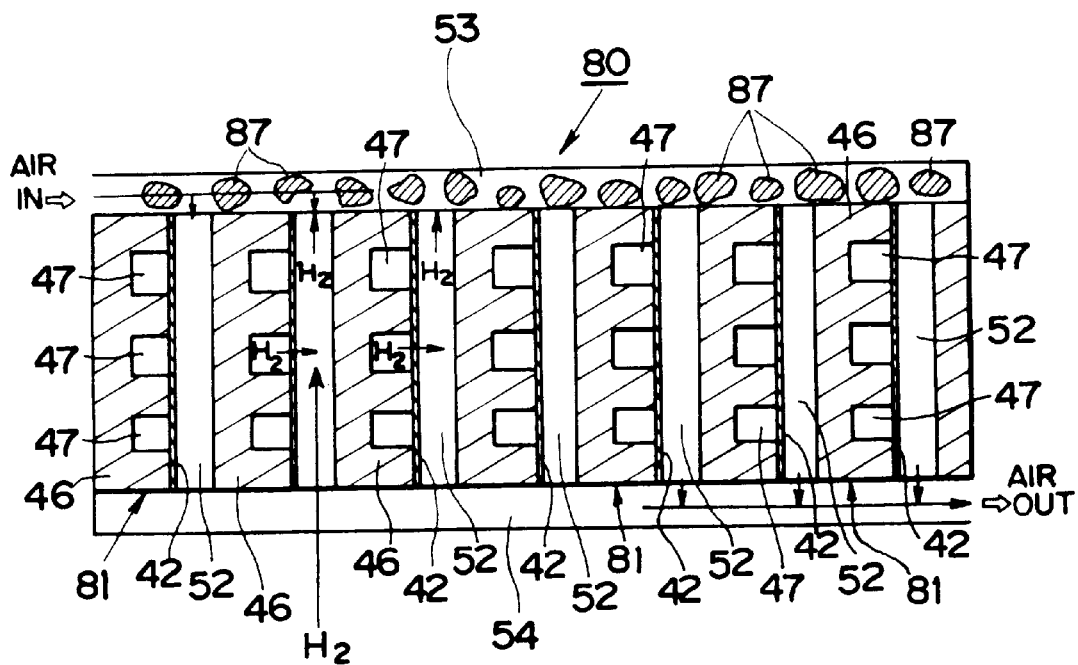
FIG. 11 is a cross sectional view showing the fuel cell of FIG. 10.
Figure 12:
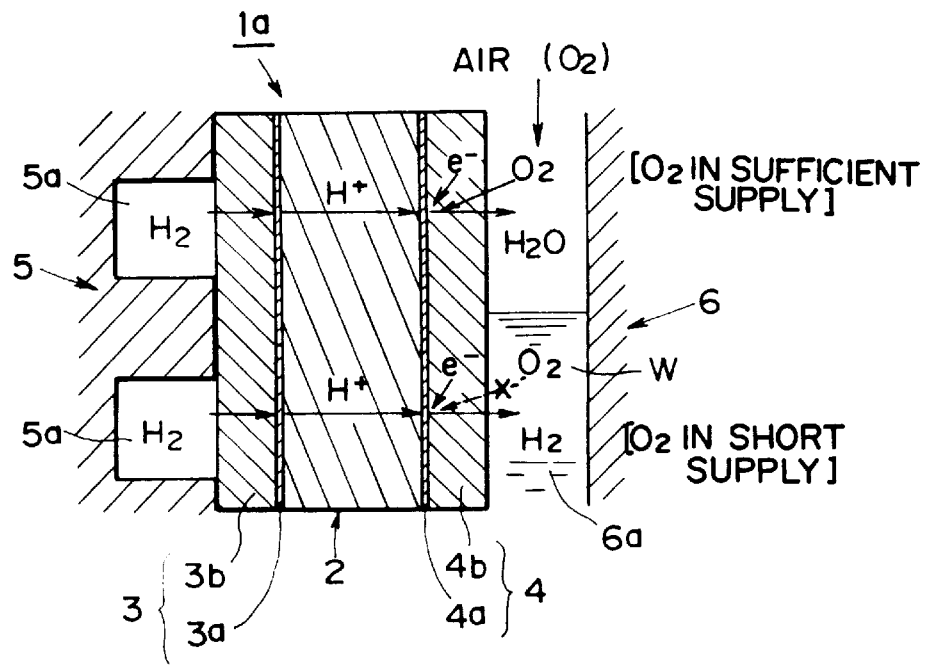
FIG. 12 is a drawing illustrating the mechanism of mixing of hydrogen gas in the oxygen electrode of a conventional fuel cell.
Figure 13:
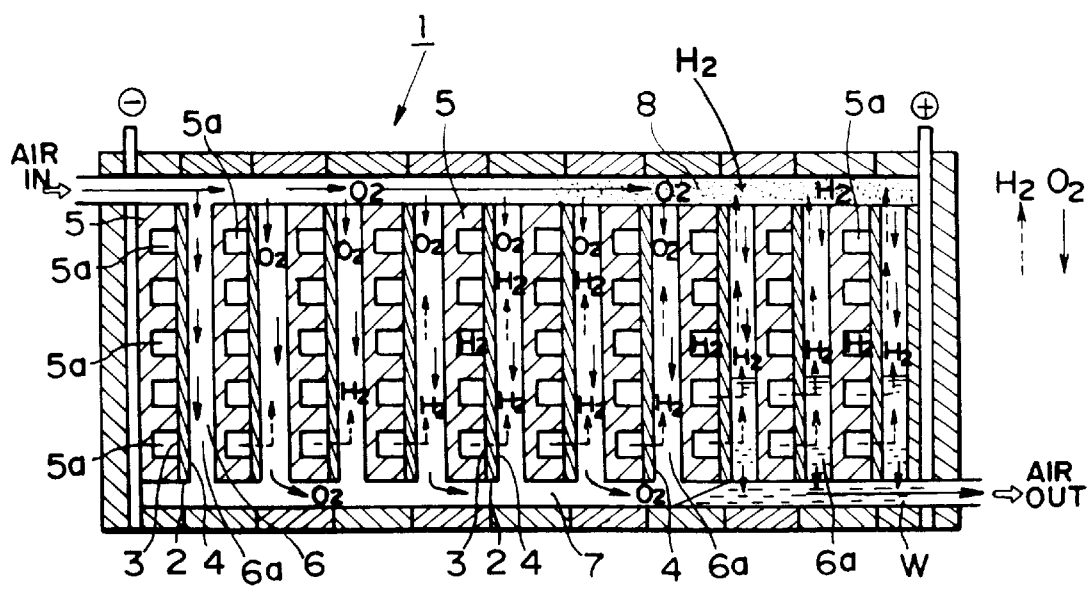
FIG. 13 is a cross sectional view of a conventional fuel cell illustrating the position of stagnation and inflammation of hydrogen gas in the fuel cell.
Figure 14:
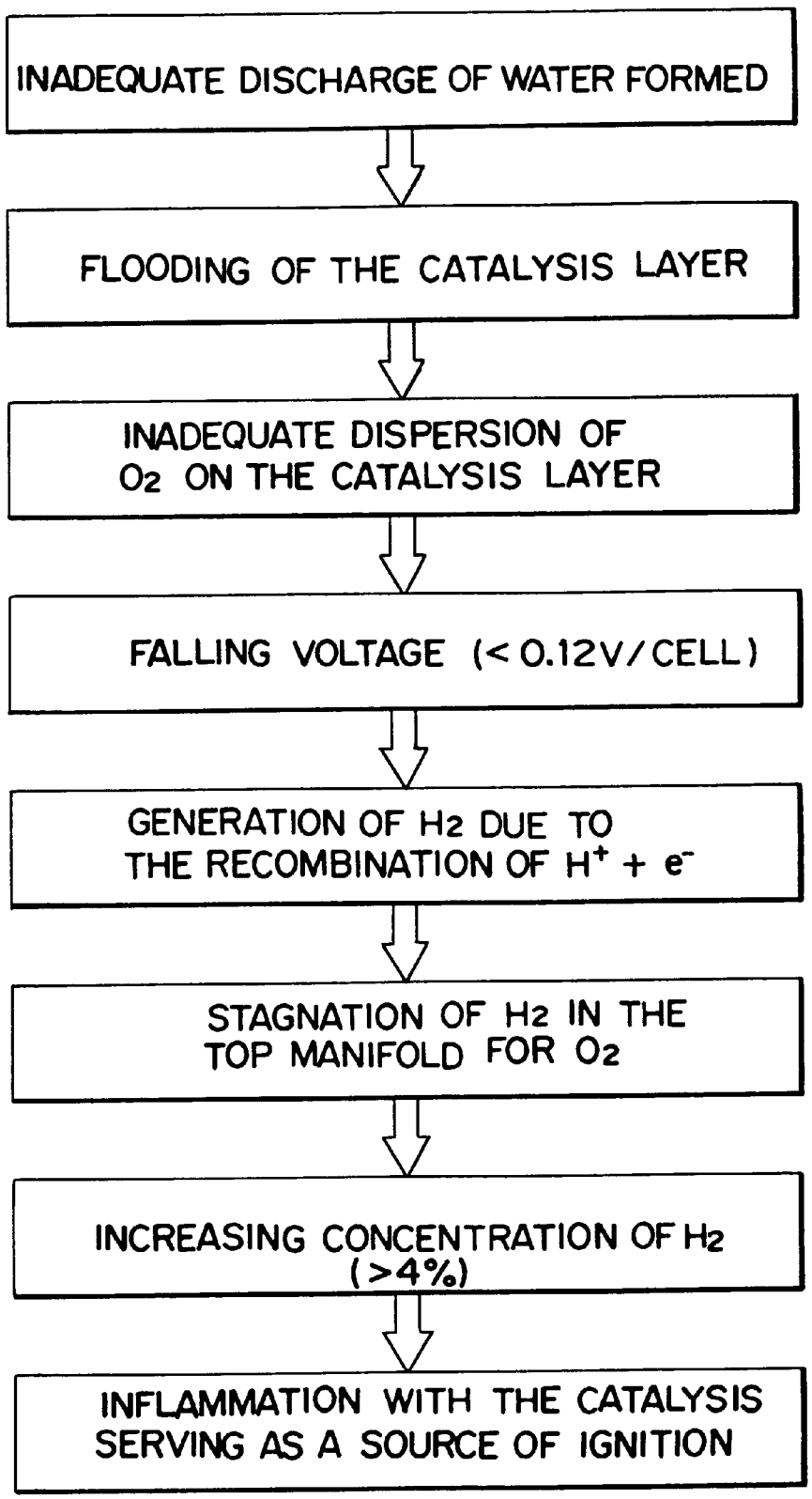
FIG. 14 is a flow chart showing the process starting with the generation to inflammation of hydrogen gas in a conventional fuel cell.

FIG. 11 shows another embodiment of fuel cell related to this invention. In the two embodiments previously described, the combustion catalysis layer was formed by coating or impregnating the inside of the oxidizing gas passage or on the surface of the cathode, while in this embodiment pellets carrying combustion catalyses are provided in the oxidizing gas passages. It should be noted further that the components identical to those used in the embodiment mentioned above are marked with identical reference numerals and any detailed descriptions thereon are omitted.

A plurality of unit cells 81 forming part of the fuel cell 80 have anodes (not shown) comprising a polyelectrolytic film 42 with a catalysis reaction layer and a gas dispersion layer on one side thereof. On the outside of this anode a carbon current collector 46 is provided in close contact and on the surface of this carbon current collector 46 facing the anode mentioned above fuel gas passages 47 are formed. Furthermore, on the other side of the polyelectrolytic film 42 mentioned above, a cathode (not shown) comprising a catalysis reaction layer and a gas dispersion layer is provide. On the other side of this cathode, a carbon current collector 46 is provided, and on the surface of this carbon current collector 46 facing the cathode 50 oxidizing gas passages 52 are formed.

The unit cells 81 formed as described above are stacked horizontally in such a way that their oxidizing gas passages 52 may be vertical, and the upstream side of the oxidizing gas passages (the top side in FIG. 11) is connected to the oxidizing gas supply side manifold 53 and the downstream side (the bottom side in FIG. 11) is connected to the oxidizing gas supply side manifold 53. And the upstream and downstream sides of the fuel gas passages 47 mentioned above and not shown are respectively connected with the supply side manifold and the discharge side manifold. And in the supply manifold 53 for oxidizing gas provide at the top of the fuel cell 80, catalysis carrier pellets 87 (dimension: several mm square or less) made on the basis of a porous carrier (alumina, carbon, etc.) containing platinum or other catalyses are scattered in the supply side manifold 53 in such a way that they do not impede the flow of oxidizing gas.

And the fuel cells 80 constructed as described above, supplied with hydrogen gas in the fuel gas passages 47 and with air in the oxidizing gas passages 52 and operated as in the case of the embodiment described above, produces the required power generating capacity.

Now, in order to test the effectiveness of preventing ignition of this embodiment, like the embodiment mentioned above, fuel gas and oxidizing gas of $H_2$/air (theoretical ratio×2) both fully humidified by means of a bubbler were introduced into the fuel cell described above to keep it in a high current density area (0.7 A/cm$^2$) in which a large amount of water is formed and in this condition the fuel cell was operated. As a result, within several tens of minutes of continuous operation, the catalysis reaction layer 48 was flooded, and the reaction did not progress satisfactory. Therefore, voltage dropped momentarily and $H_2$ developed in the oxidizing gas passage 52. However, $H_2$ moves upward in the oxidizing gas passages 52 and gathers in the supply side manifold 53, and upon coming in contact with the combustion catalysis layer 77 formed facing the oxidizing gas passage 52, $H_2$ instantly oxidizes. Thus it was confirmed that the mixing of a large amount of $H_2$ in oxidizing gas can be prevented.

Therefore, according to this embodiment, even if hydrogen gas mixes and stagnates in oxidizing gas contained in the supply side manifold 53 of the fuel cell 80, upon coming in contact with the catalysis carrying pellets 87 hydrogen gas burns so that the concentration of $H_2$ may be constantly maintained equal to or less than 4%, the lowest explosion limit. Therefore, the mild combustion at normal pressure while the concentration of $H_2$ is low enables to remove any adverse effects of combustion to the fuel cell.

And while, in the fuel cell 80 of this embodiment, the case of scattering catalysis carrying pellets 87 in the supply side manifold 53 is described, the mounting of these catalysis carrying pellets 87 in the discharge side manifold 54 or in the oxidizing gas passages 52 in such a way that would not obstruct the flow of gas can produce similar effects.

Furthermore, while in each embodiment described above, the removal of hydrogen gas formed by its recombination with protons and electrons in the oxidizing gas passages and mixed in oxidizing gas is described, hydrogen gas having penetrated in the oxidizing gas pipe line due to defective seals or oxidizing gas having penetrated in the fuel gas pipe line can be removed by mounting combustion catalyses at positions where they can come in contact with gas in the fuel cell. Therefore, not only when hydrogen gas has generated due to anomalies during the operation of the fuel cell, but also during shut-down (when gas is not flowing) when hydrogen gas has infiltrated a thin electrolytic film to mix in oxygen gas, this combustion catalysis can remove effectively hydrogen gas and prevent ignition within the fuel cell at the time of the following start-up.

The advantages obtained by this invention can be summarized as follows:

According to the operation control method of polyelectrolytic cells of this invention, in view of the fact that falls in output voltage due to flooding and other phenomena result in increased supply or pressure of oxidizing gas, it is possible to accelerate the supply of oxygen to the surface of electrodes to prevent any possible falls in output voltage and as a result it is possible to prevent in advance sudden generation of fuel gas resulting from a sharp fall in output voltage. When the supply of oxidizing gas is increased sharply, the evaporation and discharge of excessive moisture on the surface of electrodes causing floodings can be accelerated and thus flooding can be dissolved at an early stage. Such effects will be more conspicuous when the humidity of oxidizing gas is reduced.

According to this invention, furthermore, when fuel gas has started to spring up suddenly, the gas is caught in a chamber and ignited by means of a igniter. In this way, the combustion of fuel gas in the fuel cell and any resulting damages to the cell can be prevented.

In addition, the fuel cell of this invention is characterized in that hydrogen gas having mixed in oxidizing gas, upon coming in contact with the combustion catalysis layer formed in the reaction gas passage, is burnt mildly at an early stage. Thus, any increases in the concentration of hydrogen gas are limited and inflammation in the fuel cell can be prevented and stable output can be obtained.

And upon coming in contact with the combustion catalysis layer formed on the cathode facing the reaction gas passage, hydrogen gas having mixed in burns mildly at an early stage, restricting any increase in the concentration of hydrogen gas having mixed in oxidizing gas. Thus, it is possible to prevent inflammation within the fuel cell and obtain a stable output.

Moreover, combustion catalyses mounted in either one of the reaction gas supply side manifold and the reaction gas discharge side manifold connected with the reaction gas passages enable to burn mildly and at an early stage hydrogen gas stagnating in the manifold and restrict any increases in the concentration of hydrogen gas having mixed. Thus, it is possible to prevent inflammation within the fuel cell and to obtain a stable output.

What is claimed is:

1. A system for generating electric power, comprising:
   a polyelectrolytic fuel cell having a plurality of stacked unit cells capable of generating electric power by causing chemical reactions between a fuel gas and an oxidizing gas through a polyelectrolytic film;
   an oxidizing gas supply line connected to said fuel cell and having an oxidizing gas control device which controls a characteristic of the oxidizing gas being supplied to said fuel cell;
   an output voltage detector positioned to determine an output voltage of the electric power generated by said fuel cell; and
   a controller receiving an input from said output voltage detector and having first means for comparing the determined output voltage to a predetermined voltage corresponding to flooding of said fuel cell, and for controlling said characteristic of the oxidizing gas being supplied to said fuel cell, when the comparison of said first means for comparing indicates the presence of flooding, such that the flooding tends to diminish.

2. The system of claim 1, wherein said characteristic is one of a supply rate of the oxidizing gas, the pressure of the oxidizing gas and the humidity of the oxidizing gas.

3. The system of claim 1, further comprising second means for comparing the determined output voltage to a predetermined voltage corresponding to a fuel gas in a highest position of said fuel cell reaching combustion conditions, wherein said controller further comprises means for shutting off a supply of the fuel gas to said fuel cell when the comparison of said second means for comparing indicates the presence of the combustion conditions.

4. The system of claim 3, further comprising means for igniting the fuel gas in the highest position of said fuel cell after the supply of the fuel gas to said fuel cell has been shut off.

5. The system of claim 1, wherein said controller further comprises means for determining an internal resistance of said fuel cell, means for comparing the determined internal resistance to a predetermined internal resistance, and means for controlling the humidity of the oxidizing gas being supplied to said fuel cell as a function of the comparison in said means for comparing the determined internal resistance to a predetermined internal resistance.

6. The system of claim 1, wherein said controller further comprises means for determining the humidity of oxidizing gas being discharged from said fuel cell, means for comparing the determined humidity to a predetermined humidity, and means for controlling the humidity of the oxidizing gas being supplied to said fuel cell as a function of the comparison in said means for comparing the determined humidity to a predetermined humidity.

* * * * *